United States Patent Office 2,858,190
Patented Oct. 28, 1958

2,858,190
STABILIZATION OF SULFUR TRIOXIDE

James R. Jones, Tonawanda, N. Y., assignor to Olin Mathieson Chemical Corporation, a corporation of Virginia No Drawing. Application December 1, 1955
Serial No. 550,490

6 Claims. (Cl. 23—174)

This invention relates to the stabilization of substantially pure sulfur trioxide against high degrees of polymerization.

On standing at room temperature, probably due to the presence of traces of moisture, liquid sulfur trioxide will polymerize to various forms which are denoted by gamma, beta and alpha and which melt at about 17° C., 33° C. and 62° C., respectively. The mass becomes solid and may require temperatures of up to 100° C. to completely reliquefy it.

This property of $SO_3$ creates disadvantages in its shipping, storage and use. While these disadvantages may be overcome by, for example, the use of containers equipped with heating elements, this would incur considerable expense. Reliquefaction at elevated temperatures would also demand special containers capable of withstanding the high pressures of $SO_3$ at the higher temperatures.

It is an object of this invention to provide a means for preventing liquid sulfur trioxide from polymerizing to the higher melting forms.

According to this invention, minor proportions of a diaryl nitrosoamine are added to the sulfur trioxide. Preferred nitrosoamines fall into the generic class:

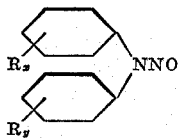

wherein R is selected from the group comprising hydrogen, lower hydrocarbon, halogen, and sulfonic acid groups and x and y are integers less than 4. The various substituents can be the same or different. Examples of suitable compounds are diphenylnitrosoamine, bis(p-chlorophenyl)nitrosoamine, ditolylnitrosoamine ($(p-MeC_6H_4)_2NNO$), N-nitroso di-beta-naphthylamine, N-nitroso phenyl-beta-naphthylamine, and bis(p-sulfophenyl)nitrosoamine.

The addition of such a compound to the sulfur trioxide results in the formation of small amounts of a gum or sludge probably due to the sulfonation of the organic portion of the stabilizer. After the addition, the whole mixture is aged by heating, generally for a period of from about 6 to 10 hours at a temperature of from about 40° C. to about 80° C. After the ageing has been completed the stabilized sulfur trioxide can be decanted if a sludge-free product is desired. It is preferable to protect the so-stabilized mixture as well as possible from atmospheric moisture. This is advisable because the moisture will eventually cause the nitrosoamine to lose its effectiveness. The amount of stabilizer added depends on the amount of exposure to humidity which the stabilized material will face. I have found that as little as about 0.1 weight percent of the nitrosoamine is effective in a substantially pure $SO_3$ which is well sealed from the atmosphere. There is little reason to add more than about 2 weight percent of the nitrosoamine, as this would excessively contaminate the $SO_3$.

The following example illustrates the method of this invention and is not in any way limiting.

Example

A mixture of 65 grams of liquid sulfur trioxide containing 0.3 gram of diphenylnitrosoamine (0.46 weight percent) was sealed in a glass bulb. The mixture was then aged at a temperature of 60° C. for eight hours, during which time a thick gum-like material settled to the bottom of the container. After this ageing period the material was cooled to room temperature and frozen. The entire sample, except for the small amount of residue, could then be remelted at 16° C. to 25° C. The stabilized sulfur trioxide was then again frozen and maintained at −10° C. for 8 days. The sample then melted at 33° C.

I claim:

1. Sulfur trioxide which has been stabilized against polymerization by incorporating therein from about 0.1 to about 2 percent by weight of at least one compound of the formula:

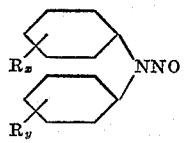

wherein R is selected from the group consisting of hydrogen, lower hydrocarbon groups of 1 to 4 carbon atoms, halogen and sulfonic acid groups and x and y are integers less than 4.

2. Sulfur trioxide which has been stabilized against polymerization by incorporating therein from about 0.1 to about 2 percent by weight of diphenylnitrosoamine.

3. A method for the preparation of sulfur trioxide stabilized against polymerization which comprises incorporating therein from about 0.1 to about 2 percent by weight of at least one compound of the formula:

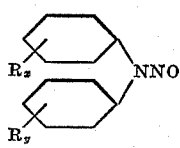

wherein R is selected from the group consisting of hydrogen, lower hydrocarbon groups of 1 to 4 carbon atoms, halogen and sulfonic acid groups and x and y are integers less than 4 and thereafter heating the mixture at a temperature within the range from about 40° C. to about 80° C. for a period of from 6 to 10 hours.

4. A method for the preparation of sulfur trioxide stabilized against polymerization which comprises incorporating therein from about 0.1 to about 2 percent by weight of diphenylnitrosoamine.

5. Sulfur trioxide which has been stabilized against polymerization by incorporating therein from about 0.1 to about 2 percent by weight of at least one diaryl nitrosoamine.

6. A method for the preparation of sulfur trioxide stabilized against polymerization which comprises incorporating therein from about 0.1 to about 2 percent by weight of at least one diaryl nitrosoamine.

References Cited in the file of this patent

UNITED STATES PATENTS 2,240,935   Lepin _____ May 6, 1941